(12) United States Patent
Kujacznski

(10) Patent No.: US 11,741,758 B2
(45) Date of Patent: Aug. 29, 2023

(54) INSPECTION SYSTEM FOR MANUFACTURED COMPONENTS

(71) Applicant: General Inspection, LLC, Davisburg, MI (US)

(72) Inventor: Nathan Kujacznski, Swartz Creek, MI (US)

(73) Assignee: General Inspection, LLC, Davisburg, MI (US)

(*) Notice: Subject to any disclaimer, the term of this patent is extended or adjusted under 35 U.S.C. 154(b) by 407 days.

(21) Appl. No.: 17/080,926

(22) Filed: Oct. 27, 2020

(65) Prior Publication Data

US 2022/0130178 A1 Apr. 28, 2022

(51) Int. Cl.
*G07C 3/00* (2006.01)
*G01N 21/88* (2006.01)

(52) U.S. Cl.
CPC ......... *G07C 3/005* (2013.01); *G01N 21/8851* (2013.01); *G01N 2021/8854* (2013.01); *G01N 2021/8887* (2013.01)

(58) Field of Classification Search
CPC ............................ G07C 3/005; G01N 21/8851
See application file for complete search history.

(56) References Cited

U.S. PATENT DOCUMENTS

| | | | |
|---|---|---|---|
| 6,064,759 A | 5/2000 | Buckley et al. | |
| 7,403,872 B1 | 7/2008 | St. Onge et al. | |
| 9,575,013 B2* | 2/2017 | Nygaard | G01N 21/909 |
| 11,099,119 B1* | 8/2021 | Nygaard | G01N 21/8806 |
| 2014/0346094 A1 | 11/2014 | Nygaard | |
| 2015/0204798 A1* | 7/2015 | Nygaard | G01N 21/9515 |
| | | | 356/237.2 |

* cited by examiner

*Primary Examiner* — Bryan Bui
(74) *Attorney, Agent, or Firm* — Brooks Kushman P.C.

(57) ABSTRACT

An inspection station for manufactured components includes a framework and a plurality of cameras. The framework has of a plurality of vertically stacked and spaced apart plates. Each plate defines a central orifice. The central orifices of each plate are aligned along an axis. The manufactured components are configured to freefall through the central orifices defined by the plates. The plurality of cameras is secured to the framework. Each camera is focused toward a region within the framework to capture images of the manufactured components. The plurality of cameras is arranged in an array that extends radially about the axis. At least one of the cameras is positioned at an angle above a horizontal plane that is perpendicular to the axis and intersects the region within the framework. At least one of the cameras is positioned at an angle below the horizontal plane.

20 Claims, 5 Drawing Sheets

INSPECTION SYSTEM FOR MANUFACTURED COMPONENTS

TECHNICAL FIELD

The present disclosure relates to inspection systems for manufactured products or components.

BACKGROUND

Inspection systems may be utilized to detect defects in manufactured products during production of such manufactured products.

SUMMARY

An inspection system for manufactured components includes a framework, a plurality of cameras, an inlet conveyance system, an outlet conveyance system, and a controller. The framework defines an internal cavity, an upper aperture, and a lower aperture. The upper aperture and the lower aperture are arranged along an axis. The plurality of cameras is secured to the framework. Each camera is focused toward a center region within the internal cavity to capture images of the manufactured components. The plurality of cameras is arranged in an array that extends radially about the axis and at various angles above and below a horizontal plane that is perpendicular to the axis and intersects the center region within the internal cavity. The inlet conveyance system is configured to direct the manufactured components into the upper aperture such that the manufactured components fall through the center region within the internal cavity and out of the lower aperture. The outlet conveyance system is configured to direct the manufactured components toward a first path or a second path. The controller is programmed to, in response to a feature of one or more of the manufactured components detected via the plurality of cameras being within a tolerable range, control the outlet conveyance system to direct the one or more of the manufactured components toward the first path. The controller is further programmed to, in response to the feature of the one or more of the manufactured components detected via the plurality of cameras being outside of the tolerable range, control the outlet conveyance system to direct the one or more of the manufactured components toward the second path.

An inspection station for manufactured components includes a framework and a plurality of cameras. The framework has of a plurality of vertically stacked and spaced apart plates. Each plate defines a central orifice. The central orifices of each plate are aligned along an axis. The manufactured components are configured to freefall through the central orifices defined by the plates. The plurality of cameras is secured to the framework. Each camera is focused toward a region within the framework to capture images of the manufactured components. The plurality of cameras is arranged in an array that extends radially about the axis. At least one of the cameras is positioned at an angle above a horizontal plane that is perpendicular to the axis and intersects the region within the framework. At least one of the cameras is positioned at an angle below the horizontal plane.

An inspection system comprising, an inspection station, a plurality of sensors, and a controller. Each sensor is focused toward a center region of the inspection station to capture images of manufactured components free falling through the inspection station. The plurality of sensors is arranged in an array that extends radially about an axis. A first portion of the plurality of sensors are arranged at various angles above a horizontal plane that is perpendicular to the axis and intersects the center region of the inspection station. A second portion of the plurality of sensors are arranged at various angles below the horizontal plane. The controller is programmed to, in response to a feature of one or more of the manufactured components detected via the plurality of sensors being within a tolerable range, direct the one or more of the manufactured components toward a passing component path. The controller is further programmed to, in response to the feature of the one or more of the manufactured components detected via the plurality of sensors being outside of the tolerable range, direct the one or more of the manufactured components toward a rejected component path.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
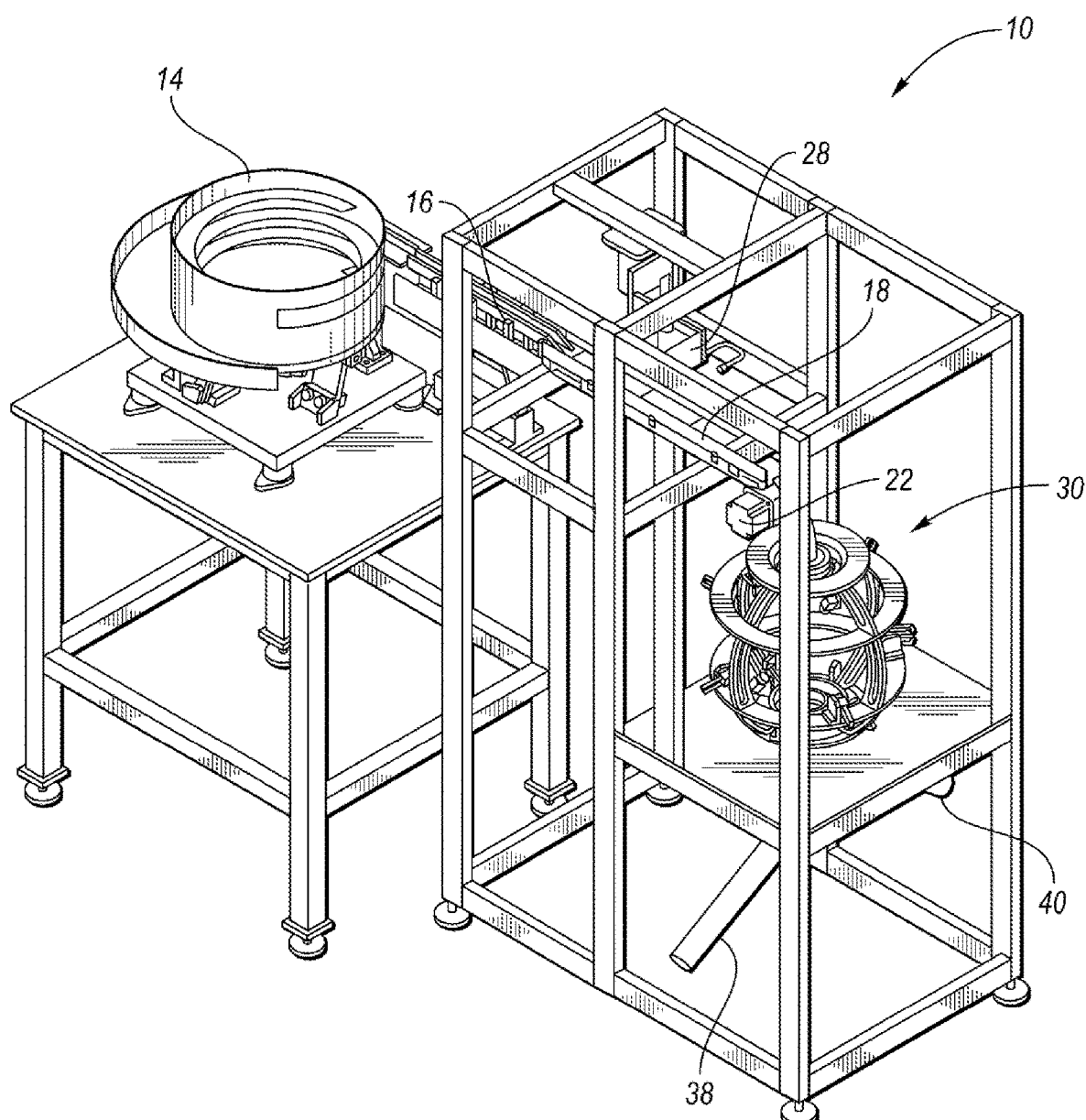
FIG. 1 is an isometric view of an inspection system for manufactured components that includes a conveyance system and an inspection station.
Figure 3:
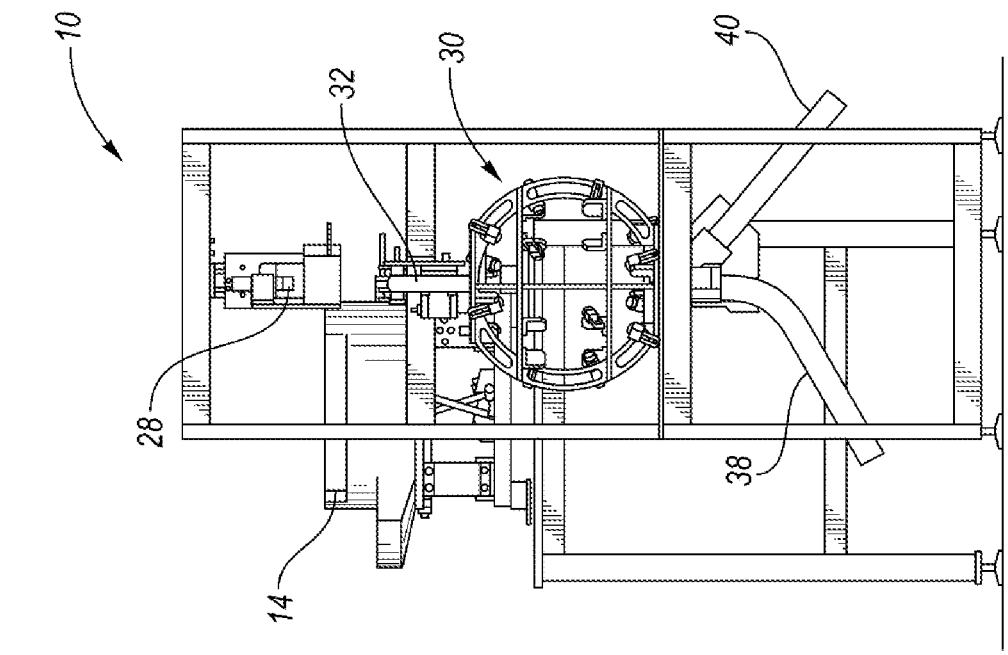
FIG. 3 is a side view of the inspection system for manufactured components that includes the conveyance system and the inspection station.
Figure 2:
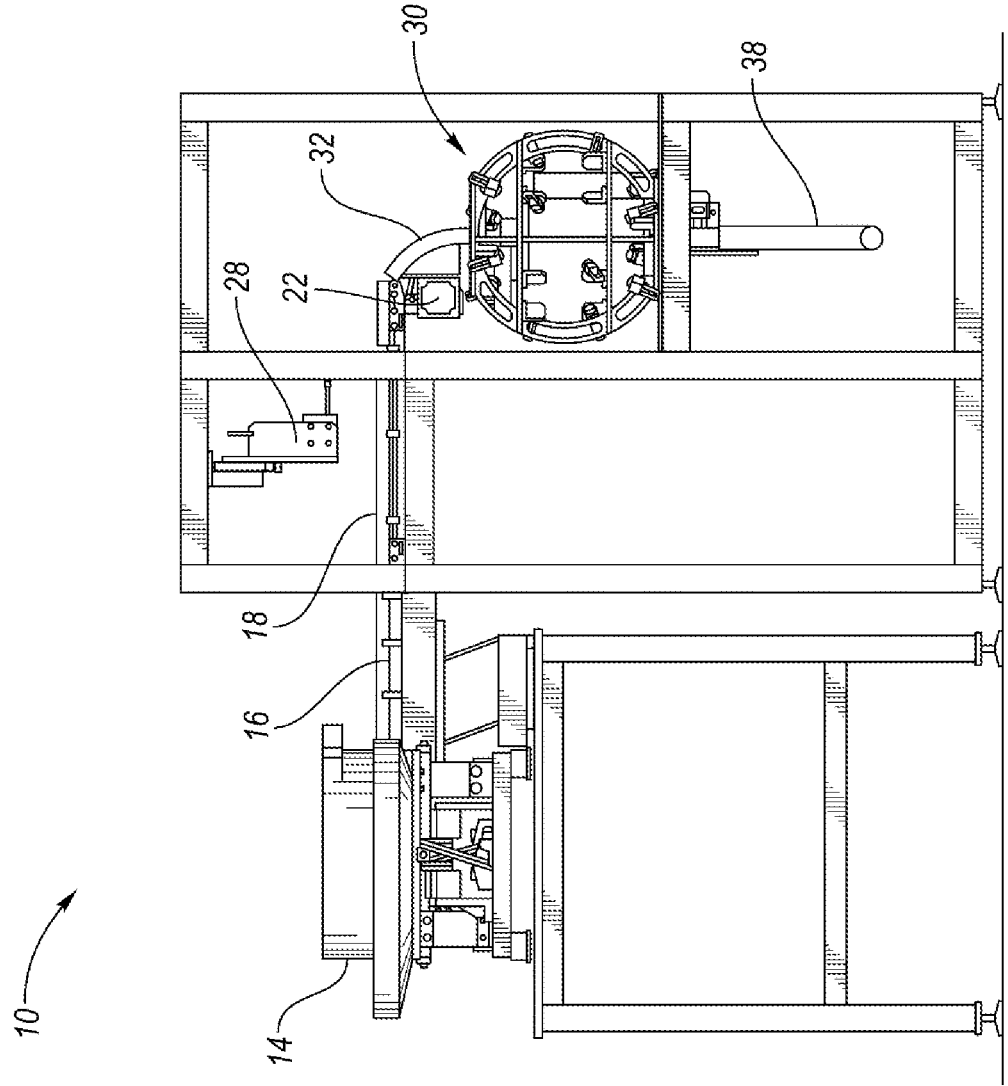
FIG. 2 is a front view of the inspection system for manufactured components that includes the conveyance system and the inspection station.
Figure 4:
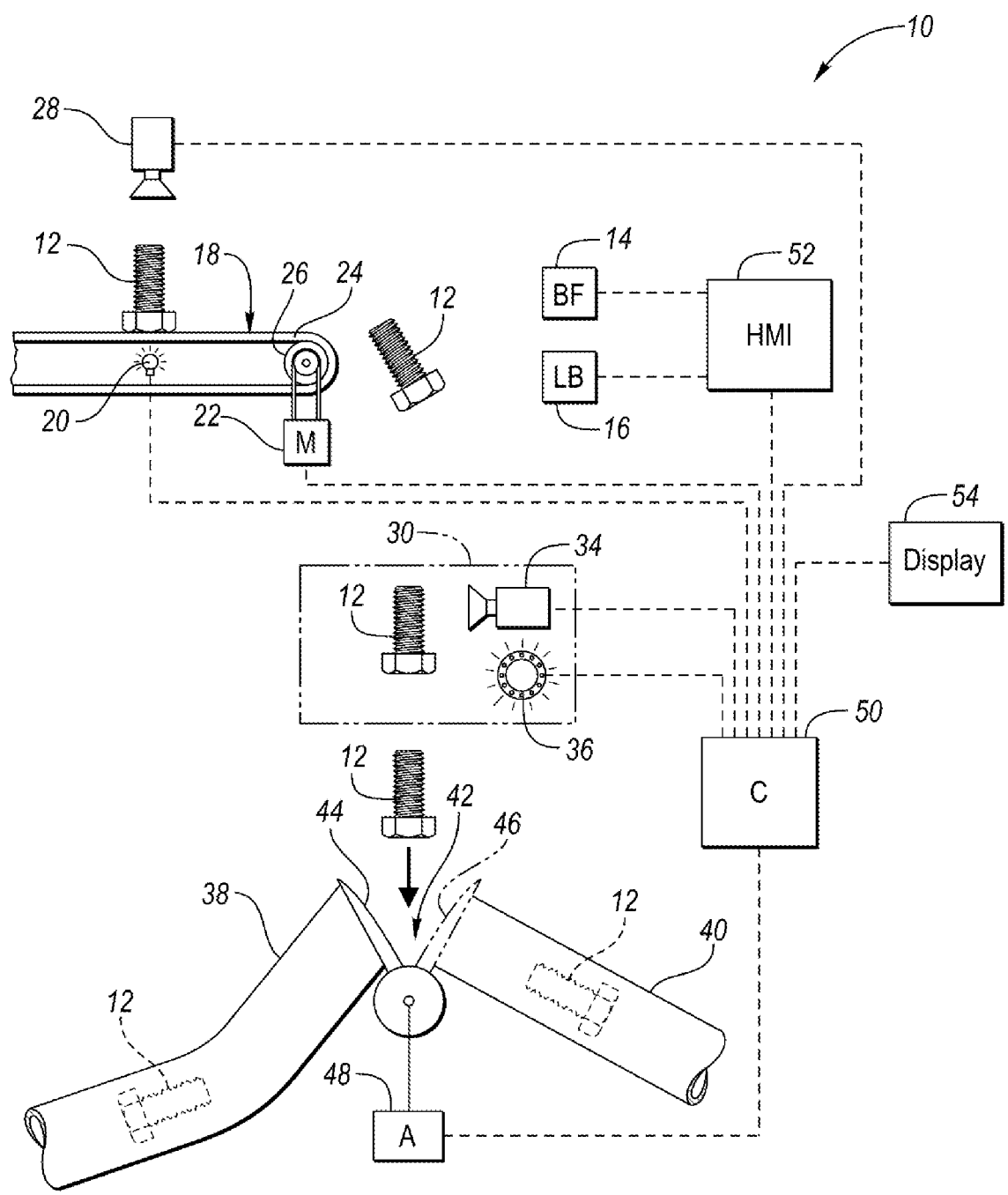
FIG. 4 is schematic diagram illustrating the control system for the inspection system.

Referring to FIGS. 1-4, an inspection system 10 for manufactured parts or components 12 is illustrated. The inspection system 10 may be utilized to inspect the manufactured components 12 for defects. Although bolts or fasteners are illustrated in FIG. 4, the manufactured components 12 may be any component or part that is being massed produced such as, but not limited to, fasteners, bolts, screws, rivets, ammunition cartridges, bottles, nails, bearings (e.g. ball or needle bearings), etc. The inspection system 10 may also be configured to sort the manufactured components 12 into a group of components that have "passed" the inspection and a group of components that have "failed" the inspection. The components that have "failed" the inspection may be referred to as rejected components or parts. The group of components that have "passed" the inspection may be defect free or may have features and/or defects that are within a tolerable range. The group of components that have "failed" the inspection may have features and/or defects that are outside of the tolerable range. A feature that is outside of a tolerable range may also be referred to as a defect.

The inspection system 10 may include a bowl feeder 14. The manufactured components 12 may be manually loaded into the bowl feeder 14 or may be delivered into the bowl feeder 14 via an additional conveyance system (not shown). The bowl feeder 14 may vibrate to line up and orient the manufactured components 12 within a channel defined by the bowl feeder 14. The manufactured components 12 are then delivered from the channel defined by bowl feeder 14 to a linear vibrator 16. The linear vibrator 16 vibrates such that the oriented manufactured components 12 are advanced along the linear vibrator and onto a conveyor 18. The conveyer 18 may include backlighting 20 to illuminate the manufactured components 12 as the manufactured components 12 are being transported across the conveyer 18. The backlighting 20 may be any type of light source such as, but not limited to, a light emitting diode (LED), an incandescent light bulb, a fluorescent light source, etc. The conveyor 18 may also include an actuator 22, such as, but not limited to, an electric motor, that is configured generate movement of the conveyer 18. More specifically, the conveyer 18 may include a belt 24 that is moveable along a pulley 26, and the actuator 22 may be configured to rotate the pulley 26 to generate linear motion along a top surface of the belt 24.

The inspection system 10 may include an overhead camera 28 that is focused downward toward the conveyor 18. The overhead camera 28 may be configured to capture images of the manufactured components 12 as the manufactured components 12 are transported across the conveyor 18. More specifically, the overheard camera 28 may be configured to capture an outer profile of an oriented component, such as an outer diameter of a bolt head or an outer diameter of an ammunition cartridge. The overhead camera 28 may include an on-axis light source that is configured to direct light toward an area of the conveyor 18 that the overhead camera 28 is focused towards. The on-axis light source may be any type of light source such as, but not limited to, a light emitting diode (LED), an incandescent light bulb, a fluorescent light source, etc.

The conveyor 18 is then configured to deliver the manufactured components 12 to an inspection station 30. More specifically, the conveyor 18 may end and the manufactured components 12 may be configured to drop from an end of the conveyor 18 and freefall through the inspection station 30. Even more specifically, an inlet tube or chute 32 may be configured to guide the manufactured components 12 as the manufactured components 12 drop from the end of the conveyor 18 toward an upper end of the inspection station 30 so that the manufactured components 12 may freefall through the inspection station 30. The bowl feeder 14, the linear vibrator 16, the conveyor 18, and/or the inlet chute 32 may collectively be referred to as an inlet conveyance system to the inspection station 24. The inlet conveyance system should not be construed as limited to the inlet conveyance system depicted in FIGS. 1-4. The inlet conveyance system may include any type of device or combination of devices known in the art that are capable of transporting manufactured components from one location to another location, including but not limited to, conveyers, walking beams, vibratory lines, etc. Furthermore, the inspection system 10 may or may not include such an inlet conveyance system. For Example, the manufactured components 12 may just freefall from a production machine, such as stamping or cold heading machine, and through the inspection station 30. A funnel or other device may be used to try to constrict the path of the manufactured components 12 to try to "center" the manufactured components 12 as the manufactured components 12 freefall through the inspection station 30.

The inspection station 30 includes a plurality of cameras 34 or sensors that are configured to capture images or sense features of the manufactured components 12 as the manufactured components 12 freefall through the inspection station 24. The plurality of cameras 34 or sensors may each be focused toward the same region or center region within the inspection station 30. The inspection station 30 also includes at least one light source 36 that is configured to illuminate the manufactured components 12 as the manufactured components 12 freefall through the inspection station 24. The at least one light source 36 may be any type of light source such as, but not limited to, a light emitting diode (LED), an incandescent light bulb, a fluorescent light source, etc. It should be noted the although only one camera 34 or sensor and only one light source 36 are illustrated in FIG. 4, the camera 34 or sensor and at least one light source 36 should be construed to represent one or more cameras and light sources, respectively.

The plurality of cameras 34 may be single lens cameras, plenoptic cameras, stereo cameras, or any other type of camera. Alternatively, a plurality of sensors, such as triangulation sensors, may be utilized in place of the plurality of cameras 34 and/or the at least one light source 36. Triangulation sensors may include both a light source (or emitter) and a receiver, and may be configured to use triangulation to capture three-dimensional surface profiles of the manufactured components 12 during the inspection process in order to detect surface features and any defects in the surface features of manufactured components 12. It should be understood that a camera is a type of sensor. It should also be understood that any reference to a camera or cameras 34 herein may be replaced with sensor or sensors, respectively, including triangulation sensors.

Plenoptic cameras, stereo cameras, triangulation sensors may be more specifically utilized to inspect surface finishes of the manufactured components 12. This may be particularly advantageous if the manufactured components 12 are components that have been processed to reduce the friction, such as bearings. Utilizing triangulation type sensors is disclosed in U.S. Pat. No. 9,575,013, the disclosure of which is hereby incorporated in its entirety by reference herein.

The manufactured components 12 are then directed out of the inspection station 30 toward either a first path or a second path. The first path may be referred to as a "passing component or part path" while the second path may be referred to as a "failed or rejected component or part path." Directing the manufactured components 12 toward the first path may include directing the manufactured components 12 into a first outlet tube or chute 38. The first outlet chute 38 may be referred to as a "passing component or part tube or chute" that is configured to direct the manufactured components 12 that have "passed" the inspection of the inspection system 10 to a "passed components or parts bin or container" (not shown) or to an additional conveyance system (not shown). Directing the manufactured components 12 toward the second path may include directing the manufactured components 12 into a second outlet tube or chute 40. The second outlet chute 40 may be referred to as a "failed or rejected component or part tube or chute" that is configured to direct the rejected manufactured components 12 that have "failed" the inspection of the inspection system 10 to a "failed components or parts bin or container" (not shown) or to an additional conveyance system (not shown).

A sorting device 42, such a flipper, may be configured transition between a first position 44 and a second position 46 to direct the manufactured components 12 toward either the first path (e.g., the first outlet chute 38) or toward the second path (e.g., the second outlet chute 40). An actuator 48, such as, but not limited to, a solenoid, a pneumatic cylinder, or a servo motor, may be configured to transition the sorting device 42 between the first position 44 and the second position 46. The first outlet chute 38, the second outlet chute 40, and the sorting device 42 may collectively be referred to as an outlet conveyance system to the inspection station 30. The outlet conveyance system should not be construed as limited to the outlet conveyance system depicted in FIGS. 1-4. The outlet conveyance system may include any type of device known in the art that is capable of sorting manufactured components based on the results of an inspection the manufacture components.

The inspection system 10 may include a controller 50. The controller may be in communication with the bowl feeder 14, linear vibrator 16, backlighting 20, the actuator 22, the overhead camera 28, the plurality of cameras 34 (or sensors), the at least one light source 36, the actuator 48, a human machine interface (HMI) 52, and a display screen 54 via an electrical or wireless system that communications the state or condition of such components or information from such components via an electrical or wireless signal to the controller 50. The controller 50, bowl feeder 14, linear vibrator 16, backlighting 20, actuator 22, overhead camera 28, plurality of cameras 34 or sensors, at least one light source 36, actuator 48, human machine interface (HMI) 52, display screen 54, and any other component that is part of the inspection system 10 may be connected to a power source (e.g., a local power grid). Electrical wiring is not depicted in the Figures for simplicity purposes. The controller 50 may include control logic or an algorithm that is configured to detect features or defects in the manufactured components 12. More specifically, the controller 50 may include control logic or an algorithm that analyzes images or sensed features taken by the overhead camera 28 and/or the plurality of cameras 34 or sensors, which are communicated to the controller 50, in order to detect and analyze features or defects in the manufactured components 12.

Based on the images or sensed features of the manufactured components 12 the control logic or algorithm may then make a determination if any detected defects are present and/or if any features or defects are within a tolerable range. If no detected defects are present or if any detected features or defects are within a tolerable range, the manufactured components 12 may be deemed to have "passed" the inspection of the inspection system 10 and then directed to the first path (e.g., the first outlet chute 38). If any detected features or defects are not within a tolerable range, the manufactured components 12 may be deemed to have "failed" the inspection of the inspection system 10 and then directed to the second path (e.g., the first outlet chute 40).

The controller 50 may be configured to operate actuator 48 in order to transition the sorting device 42 between the first position 44 and the second position 46 in order to direct the manufactured components 12 to either the first path or the second path. The control logic or algorithm may operate to deem the manufactured components 12 as either "passing" or "failing" components while the manufactured components 12 are freefalling through the inspection station 30. The control logic or algorithm may further operate to adjust the position of the sorting device 42 via the actuator 48, prior to the manufactured components 12 reaching the sorting device 42 but after the manufactured components 12 were deemed as either "passing" or "failing" components, in order to direct the manufactured components 12 to the appropriate path based on the whether the manufactured components 12 were deemed as either "passing" or "failing."

The control logic or algorithm may be configured to time adjusting the position of the sorting device 42 after the manufactured components 12 have been detected by the plurality of cameras 34 or sensors (while freefalling through the inspection station 30) but before the manufactured components 12 reach the sorting device 42 based on the velocity and acceleration of the manufactured components 12 as the manufactured components 12 freefall through the inspection station 30. The velocity of the manufactured components 12 at the region or center region of the inspection station 30 (where each of the plurality of cameras 34 or sensors are focused and where each of the plurality of cameras 34 or sensors detect the presence of the manufactured components 12) may be deduced from an initial downward velocity of the manufactured components 12 as the manufactured components 12 exit the inlet conveyance system, a vertical distance between the inlet conveyance system and the region or center region of the inspection station 30, and an expected acceleration due to gravity that occurs between the time the manufactured components 12 exit the inlet conveyance system and reach the region or center region of the inspection station 30.

The time it takes the manufactured components 12 to reach the sorting device 42 from the region or center region of the inspection station 30 (where the plurality of cameras 34 or sensors detect the manufactured components 12) may be based on the downward velocity of the manufactured components 12 at the region or center region of the inspection station 30, a vertical distance between the region or center region of the inspection station 30 and the sorting device 42, and an expected acceleration of the manufactured components 12 that occurs dues to gravity from when the manufactured components 12 exit the center region of the inspection station 30 to when the manufactured components 12 reach the sorting device 42. This known time that it takes the manufactured components 12 to reach the sorting device 42 from the region or center region of the inspection station 30 may be programmed into the controller 50 and may be utilized to ensure the sorting device 42 is in the proper position after the manufactured components 12 have been detected by the plurality of cameras 34 or sensors but before the manufactured components 12 reach the sorting device 42.

The backlighting 20, the on-axis light source of the overhead camera 28, and/or the at least one light source 36 may be illuminated at all times the inspection system 10 is in operation or may be strobed to coincide with the images that are being taken by the overhead camera 28 or the plurality of cameras 34 or sensors. For example, the backlighting 20 and the on-axis light source of the overhead camera 28 may be strobed while images of the manufactured components 12 are being taken by the overhead camera 28. As another example, the at least one light source 36 may be strobed while images of the manufactured components 12 are being taken by the plurality of cameras 34 or sensors.

Features may include any attribute of a manufactured component such as, but not limited to, a desired dimension, geometry (e.g., a geometric shape), or a profile of the manufactured component. For example a feature may include, but is not limited to, a diameter of a bolt head, a diameter of an ammunition cartridge, a length of bolt, a length of an ammunition cartridge, an exterior profile or shape of any manufactured component, a desired threading geometry of a bolt, etc. A feature that is outside of a tolerable range may also be a defect in a manufactured component.

Defects may include any deviation beyond a tolerance from a desired dimension, geometry, or profile or any other defect of a manufactured component or product (e.g., the presence of an undesired feature). For example, if the inspection station is being utilized to inspect ammunition cartridges, the defects may include any defect listed in military standard MIL-STD-636. Such defects include but are limited to, dents, splits, perforations, cracks, scratches, wrinkles, buckles, smudges, surface blemishes, etc. As another example, if the inspection station is being utilized to inspect threaded bolts, the defect may include a deviation from a desired threading geometry, a deviation in the diameter of the bolt head from a desired diameter, any other deviation of a dimension, geometry, or profile that is greater than a tolerance, or any defect described immediately above (i.e., dents, splits, perforations, cracks, scratches, wrinkles, buckles, smudges, surface blemishes, etc.). If the inspection station is being utilized to inspect any other manufactured products or components (e.g., a bottle, nail, rivet, etc.) the defect may include any deviation of a dimension, geometry, or profile that is greater than a tolerance or any of the defects described immediately above (i.e., dents, splits, perforations, cracks, scratches, wrinkles, buckles, smudges, surface blemishes, etc.).

Defect detection may be conducted by running several image processing algorithms within the controller and then analyzing the resultant pixel brightness values. Groups of pixels whose brightness values exceed a preset threshold are flagged as a "bright defect," while groups of pixels whose brightness values lie below a preset threshold are flagged as a "dark defect." Different image processing techniques and threshold values are often needed to inspect for bright and dark defects on the manufactured products or components or within a region of the manufactured products or components. Such imaging techniques to detect defects on manufactured products or components are disclosed in U.S. Pat. No. 9,575,013, the disclosure of which is hereby incorporated in its entirety by reference herein.

The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the inspection system 10.

The control strategies and/or logic may be implemented by the controller 50 using one or more processing strategies such as event-driven, interrupt-driven, multi-tasking, multi-threading, and the like. As such, various steps or functions of the control strategies and/or logic may be performed in a desired sequence, in parallel, or in some cases omitted. Although not always explicitly illustrated, one of ordinary skill in the art will recognize that one or more of the steps or functions may be repeatedly performed depending upon the particular processing strategy being used. Similarly, an order of processing is not necessarily required to achieve the features and advantages described herein. The control logic may be implemented primarily in software executed by a microprocessor-based controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the inspection station 10, its subcomponents, or its subsystems. The computer-readable storage devices or media may include one or more of a number of known physical devices which utilize electric, magnetic, and/or optical storage to keep executable instructions and associated calibration information, operating variables, and the like.

The HMI 52 may include an interface that allows an operator or user to operate the inspection station 10. For example, the HMI 52 may include control buttons or a touch screen that allow an operator to initiate automated or manual operation of the bowl feeder 14, the linear vibrator 16, the conveyer 18, the backlighting 20, the actuator 22, the overhead camera 28, the plurality of cameras 34 or sensors, the at least one light source 36, the actuator 48, the display screen 54, the inspection station 30 as a whole, and/or the inspection system 10 as a whole. The HMI 52 may also include control buttons or a touch screen that allow an operator to power up or power down the bowl feeder 14, the linear vibrator 16, the conveyer 18, the backlighting 20, the actuator 22, the overhead camera 28, the plurality of cameras 34 or sensors, the at least one light source 36, the actuator 48, the display screen 54, the controller 50, the inspection station 30 as a whole, and/or the inspection system 10 as a whole.

The display unit 54 may be a subcomponent of the HMI 52 (e.g., a touchscreen) or may be a separate component from the HMI 52. The display unit 54 may be configured to display whether or not the inspection system 10 and/or the subcomponents of the inspection system 10 are in an "on" or "off" state; the current operating condition of the inspection system 10 and/or the subcomponents of the inspection system 10 (e.g., whether the inspection system 10 and/or the subcomponents of the inspection system 10 are operating in an automated or manual mode); whether or not there are any faults within the inspection system 10 and/or the subcomponents of the inspection system 10 (e.g., a manufactured component 12 is jamming the bowl feeder 14, the linear vibrator 16, or the conveyer 18; one or more of the cameras or sensors 28, 34 are not communicating images or sensed features to controller 50; the sorting device 42 is jammed; any of the other components are not communicating with the controller 50; etc.); whether or not a "passed parts" bin or a "failed or rejected parts" bin is full; etc.

Figure 5:
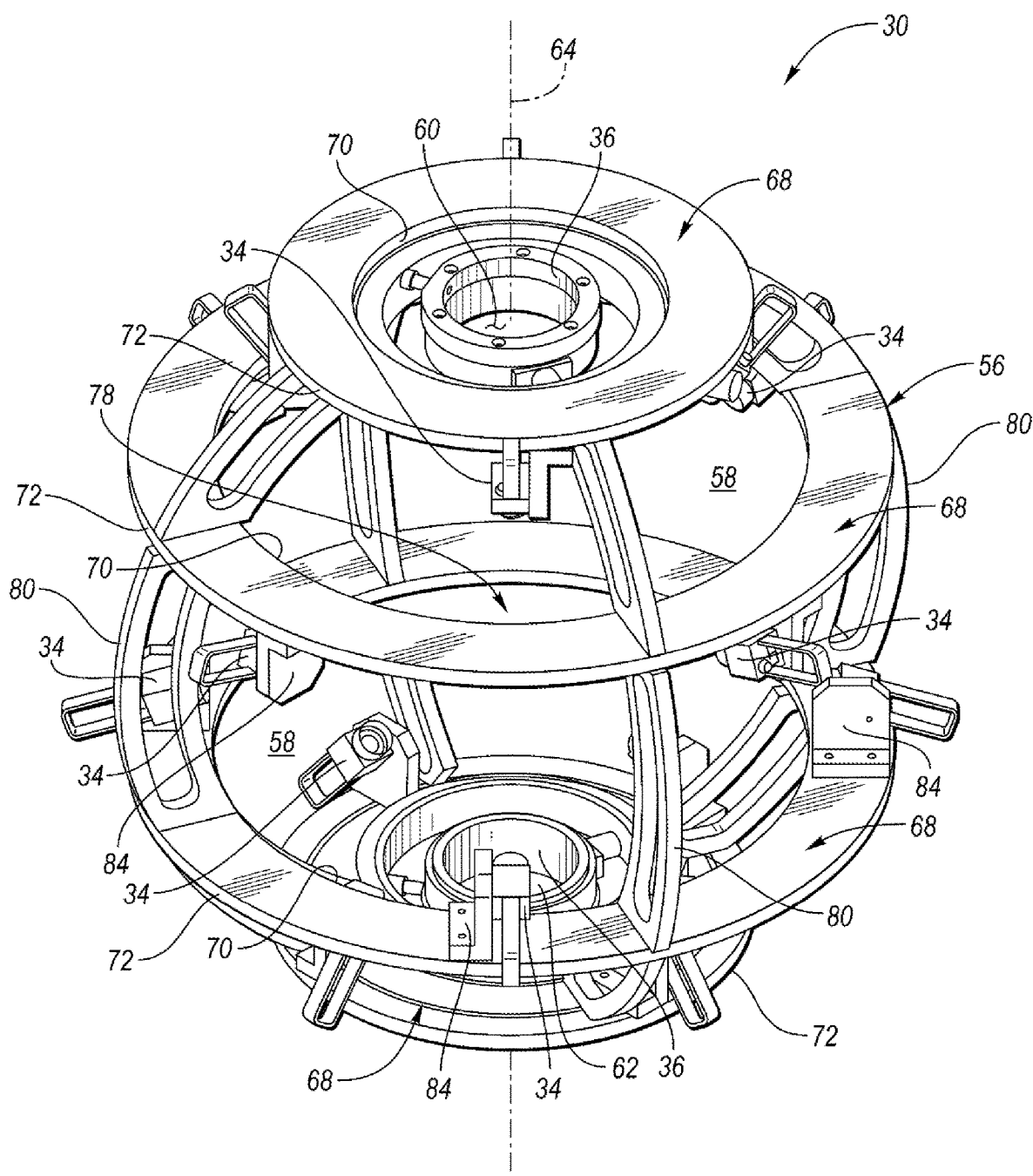
FIG. 5 is an isometric view of the inspection station.
Figure 7:
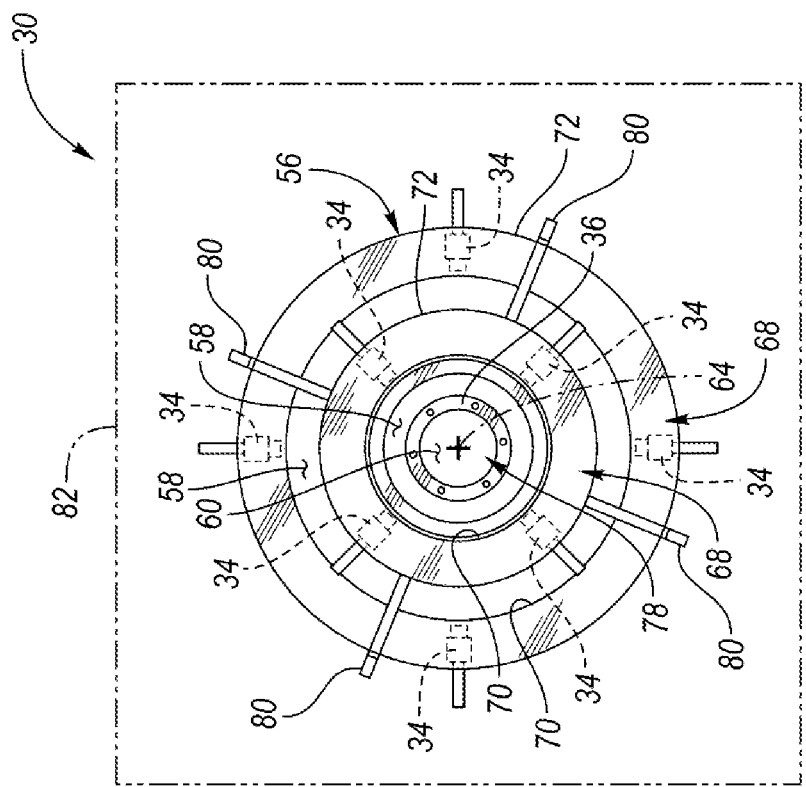
FIG. 7 is a top view of the inspection station.
Figure 6:
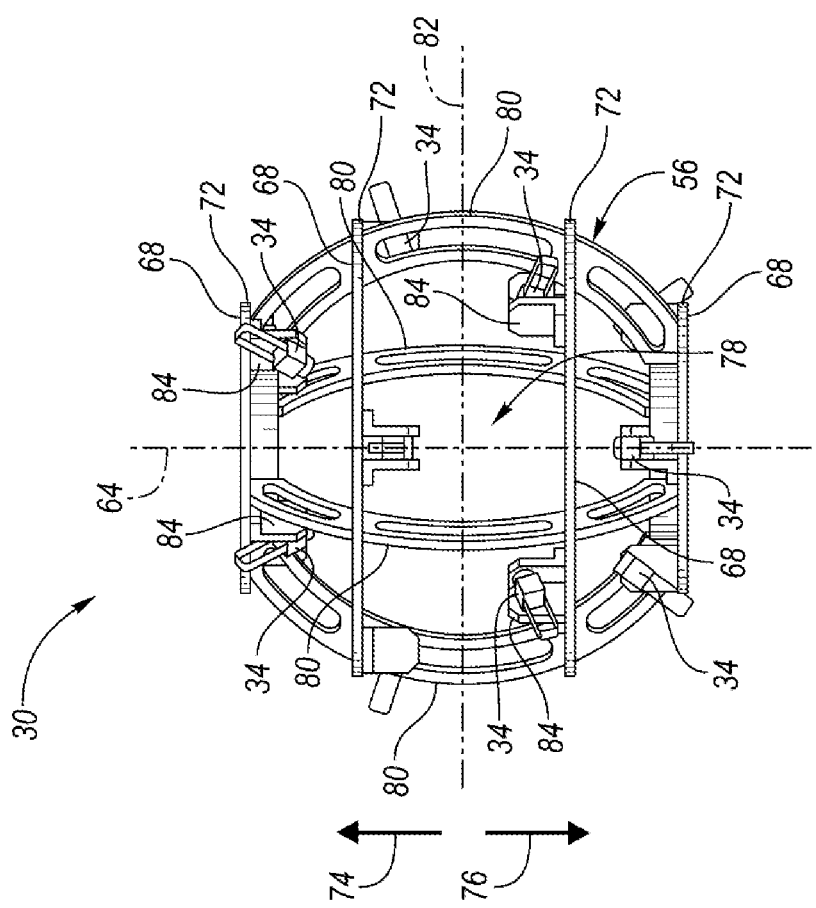
FIG. 6 is a side view of the inspection station.

Referring to FIGS. 5-7, the inspection station 30 is further described. The inspection station 30 includes a framework 56. The framework 56 defines an internal cavity 58, an upper aperture 60, and a lower aperture 62. The upper aperture 60 and the lower aperture 62 are arranged and/or aligned along an axis 64. The axis 64 may be aligned with the direction of gravity. The inlet conveyance system, or more specifically the inlet chute 32, may be configured to direct the manufactured components 12 into the upper aperture 60 such that the manufactured components fall through a region or center region within the internal cavity 58 and out of the lower aperture 62.

The framework 56 has of a plurality of vertically stacked and spaced apart plates 68. The vertically stacked and spaced apart plates 68 may be concentric rings that are aligned along the axis 64. The vertically stacked and spaced apart plates 68 may be arranged such that the plates 68 are stacked from the upper aperture 60 and the lower aperture 62. Each plate 68 defines a central orifice 70. The central orifices 70 are aligned along the axis 64. The manufactured components 12 are configured to freefall through the central orifices 70 defined by the plates 68. Outer peripheries 72 of the spaced apart plates 68 sequentially decrease in size extending in a first direction 74 and in a second direction 76. The first direction 74 extends from a region 78 within the framework 56 towards the upper aperture 60 and the uppermost of the plates 68. The second direction 76 extends from the region 78 within of the framework 56 towards the lower aperture 62 and the lowermost of the plates 68. The region 78 may more specifically be a center region of the internal cavity 58 within the framework 56 or a center region 78 of the inspection station 30 itself. The framework 56 may include a plurality of upright members 80. Each upright member 80 is secured to each of the vertically stacked and spaced apart plates 68. Each upright member 80 may be curved. The plurality of vertically stacked and spaced apart plates 68 and the plurality of upright members 80 may form a spherically shaped cage.

Each of the plurality of cameras 34 or sensors may be secured to the framework 56. Each camera or sensor of the plurality of cameras 34 or sensors may be focused toward the center region, or region 78, within the framework 56 to capture images or sense features of the manufactured components 12 as the manufactured components 12 freefall through the inspection station 30 or, more specifically, as the manufactured components 12 freefall through the internal cavity 58 framework 56. The plurality of cameras 34 or sensors is arranged in an array that extends radially about the axis 64.

At least one of the cameras or sensors of the plurality of cameras 34 or sensors is positioned at an angle above a horizontal plane 82 that is perpendicular to the axis 64 and intersects the center region or region 78. At least one of the cameras or sensors of the plurality of cameras 34 or sensors is positioned at an angle below the horizontal plane 82 that is perpendicular to the axis 64 and intersects the center region or region 78. If more than one of the cameras or sensors of the plurality of cameras 34 or sensors are positioned at an angle above the horizontal plane 82, the cameras or sensors of the plurality of cameras 34 or sensors that are positioned above the horizontal plane 82 may be referred to as a first portion of the plurality of cameras 34 or sensors and at least two of the cameras or sensors of the first portion of the plurality of cameras 34 or sensors may be positioned at various angles above the horizontal plane 82. If more than one of the cameras or sensors of the plurality of cameras 34 or sensors are positioned at an angle below the horizontal plane 82, the cameras or sensors of the plurality of cameras 34 or sensors that are positioned below the horizontal plane 82 may be referred to as a second portion of the plurality of cameras 34 or sensors and at least two of the cameras or sensors of the second portion of the plurality of cameras 34 or sensors may be positioned at various angles below the horizontal plane 82.

At least one of the cameras of the plurality of cameras 34 or sensors may be secured to each of the vertically stacked and spaced apart plates 68. Alternatively, or in addition to, one or more of the cameras of the plurality of cameras 34 or sensors may be secured to one of the upright members 80. Each of the cameras or sensors of the plurality of cameras 34 or sensors may be secured to one of the vertically stacked and spaced apart plates 68 or one of the upright members 80 via a bracket 84.

The cameras or sensors of the plurality of cameras 34 or sensors may be configured to pivot on their respective brackets 84 to adjust the focus position of the cameras or sensors (e.g., the cameras or sensors may be configured to pivot relative to the brackets 84 to adjust a pitch angle of the camera or sensor if the brackets 84 are secured to the vertically stacked and spaced apart plates 68 or the cameras or sensors may be configured to pivot relative to the brackets 84 to adjust a yaw angle of the camera or sensor if the brackets 84 are secured to the upright members 80). The brackets 84 may also be configured to pivot about the plates 68 or upright members 80 to adjust the focus position of the cameras or sensors (e.g., the brackets 84 may be configured to pivot to adjust a yaw angle of the camera or sensor if the brackets 84 are secured to the vertically stacked and spaced apart plates 68 or the brackets 84 may be configured to pivot to adjust a pitch angle of the camera or sensor if the brackets 84 are secured to the upright members 80).

Each camera or sensor of the plurality of cameras 34 or sensors may be secured to one the brackets 84 via a post that allows the camera or sensor to rotate relative to the respective bracket 84 prior to being secured in a desired position relative to the respective bracket 84. Each of the brackets 84 may be secured to either one of the stacked and spaced apart plates 68 or one of the upright members 80 via fasteners that extend though rounded slots (not shown) defined in either the spaced apart plates 68 or one of the upright members 80 so that the brackets 84 may be rotated relative to the respective stacked and spaced apart plate 68 or upright member 80 prior to being secured in a desired position relative to the respective stacked and spaced apart plate 68 or upright member 80.

The cameras or sensors of the plurality of cameras 34 or sensors that are secured to the same vertically stacked and spaced apart plate 68 may be approximately equally spaced radially about the center region or region 78 to form a radial pattern. The radial pattern of the cameras or sensors may be repeated on each vertically stacked and spaced apart plate 68, but the radial patterns of adjacent plates may be staggered so that the cameras or sensors on adjacent plates 68 are offset relative to each other so the array formed by the plurality of cameras 34 or sensors covers a greater space. For example, if four cameras or sensors are secured to each of the vertically stacked and spaced apart plates 68, the radial pattern may include spacing the cameras or sensors at approximately 90° relative to each other on each respective plate 68 and staggering adjacent plates 68 so that the cameras or sensors on adjacent plates 68 are offset approximately 45° relative to each other.

The cameras or sensors of the plurality of cameras 34 or sensors may also be oriented at angle relative to the horizontal plane 82 (e.g., pitch angles) such the angles relative to the horizontal plane 82 sequentially increase in size extending in the first direction 74 and in the second direction 76 away from the center region or region 78 to further increase the space covered by the array formed by the plurality of cameras 34 or sensors. The pattern in the which the cameras or sensors of the plurality of cameras 34 or sensors are arranged (i.e., radially about the axis 64 and above and below the horizontal plane 82) ensures that images or sensed features of the manufactured components 12 are being taken from a multitude of varying and opposite directions while the manufactured components 12 are freefalling through the center region or region 78. This ensures that any defect or feature that is outside of a tolerable range may be detected by the plurality of cameras 34 or sensors regardless of the orientation of the manufactured components 12 as the manufactured components 12 freefall through the center region or region 78.

The at least one light source 36 may be configured to direct light toward the center region or region 78 to illuminate the manufactured components 12 freefalling through the center region or region 78 so that the plurality of cameras 34 or sensors are able to capture images or sense any defect or feature that is outside of a tolerable range. A first of the at least one light sources 36 may be a light ring disposed about an upper region of the inspection station (e.g., the light ring may be disposed within the upper aperture 60, which may also be the central orifice 70 of the uppermost of the plates 68). A second of the at least one light sources 36 may be a light ring disposed about a lower region of the inspection station (e.g., the light ring may be disposed within the lower aperture 62, which may also be the central orifice 70 of the lowermost of the plates 68).

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An inspection system for manufactured components comprising:
   a framework defining an internal cavity, an upper aperture, and a lower aperture, wherein the upper aperture and the lower aperture are arranged along an axis;
   a plurality of cameras secured to the framework, each camera focused toward a center region within the internal cavity to capture images of the manufactured components, wherein the plurality of cameras is arranged in an array that extends radially about the axis and at various angles above and below a horizontal plane that is perpendicular to the axis and intersects the center region within the internal cavity;
   an inlet conveyance system configured to direct the manufactured components into the upper aperture such that the manufactured components fall through the center region within the internal cavity and out of the lower aperture;
   an outlet conveyance system configured to direct the manufactured components toward a first path or a second path; and
   a controller programmed to,
   in response to a feature of one or more of the manufactured components detected via the plurality of cameras being within a tolerable range, control the outlet conveyance system to direct the one or more of the manufactured components toward the first path, and
   in response to the feature of the one or more of the manufactured components detected via the plurality of cameras being outside of the tolerable range, control the outlet conveyance system to direct the one or more of the manufactured components toward the second path.

2. The inspection system of claim 1, wherein the framework includes a plurality of spaced apart concentric rings that are aligned along the axis and are stacked vertically from the upper aperture to the lower aperture.

3. The inspection system of claim 2, wherein outer peripheries of the spaced apart concentric rings sequentially decrease in size extending in first and second directions, wherein the first direction extends from the center region within the internal cavity towards the upper aperture and the second direction extends from the center region within the internal cavity towards the lower aperture.

4. The inspection system of claim 2, wherein at least one of the cameras is secured to each of the spaced apart concentric rings.

5. The inspection system of claim 2, wherein the framework includes a plurality of curved upright members, wherein each curved upright member is secured to each spaced apart concentric ring.

6. The inspection system of claim 1 further comprising at least one light source configured to direct light toward center region within the internal cavity.

7. The inspection system of claim 6, wherein a first of the at least one light source is a light ring disposed within the upper aperture.

8. The inspection system of claim 7, wherein a second of the at least one light source is a second light ring disposed within the lower aperture.

9. An inspection station for manufactured components comprising:
   a framework having of a plurality of vertically stacked and spaced apart plates, each plate defining a central orifice, wherein the central orifices of each plate are aligned along an axis, and wherein the manufactured components are configured to freefall through the central orifices defined by the plates; and
   a plurality of cameras secured to the framework, each camera focused toward a region within the framework to capture images of the manufactured components, wherein the plurality of cameras is arranged in an array that extends radially about the axis, at least one of the cameras is positioned at an angle above a horizontal plane that is perpendicular to the axis and intersects the region within the framework, and at least one of the cameras is positioned at an angle below the horizontal plane.

10. The inspection station of claim 9, wherein outer peripheries of the spaced apart plates sequentially decrease in size extending in first and second directions, wherein the first direction extends from the region within the framework towards the uppermost of the plates and the second direction extends from the region within of the framework towards the lowermost of the plates.

11. The inspection station of claim 9, wherein at least one of the cameras is secured to each of the plates.

12. The inspection station of claim 9, wherein the framework includes a plurality of upright members, wherein each upright member is secured to each plate.

13. The inspection station of claim 12, wherein the plurality plates and the plurality of upright members form a spherically shaped cage.

14. The inspection station of claim 9 further comprising at least one light source configured to direct light toward the region within the framework.

15. The inspection station of claim 14, wherein a first of the at least one light source is a light ring disposed within the central orifice defined by the uppermost of the plates.

16. The inspection station of claim 14, wherein a second of the at least one light source is a second light ring disposed within the central orifice defined by the lowermost of the plates.

17. An inspection system comprising:
  an inspection station;
  a plurality of sensors, each sensor focused toward a center region of the inspection station to capture images of manufactured components free falling through the inspection station, wherein the plurality of sensors is arranged in an array that extends radially about an axis, wherein a first portion of the plurality of sensors are arranged at various angles above a horizontal plane that is perpendicular to the axis and intersects the center region of the inspection station, and wherein a second portion of the plurality of sensors are arranged at various angles below the horizontal plane; and
  a controller programmed to,
    in response to a feature of one or more of the manufactured components detected via the plurality of sensors being within a tolerable range, direct the one or more of the manufactured components toward a passing component path, and
    in response to the feature of the one or more of the manufactured components detected via the plurality of sensors being outside of the tolerable range, direct the one or more of the manufactured components toward a rejected component path.

18. The inspection system of claim 17 further comprising at least one light source configured to direct light toward center region of the inspection station.

19. The inspection system of claim 18, wherein a first of the at least one light source is a light ring disposed at an upper region of the inspection station.

20. The inspection system of claim 19, wherein a second of the at least one light source is a second light ring disposed at a lower region of the inspection station.

* * * * *